United States Patent [19]
Dailey et al.

[11] Patent Number: 5,985,961
[45] Date of Patent: Nov. 16, 1999

[54] MONOFILAMENT

[75] Inventors: Bernard C. Dailey, Spartanburg, S.C.; Daniel J. Scharf, Matthews; Klaus Keck-Antoine, Charlotte, both of N.C.

[73] Assignee: Johns Manville International, Inc., Denver, Colo.

[21] Appl. No.: 08/877,783

[22] Filed: Jun. 17, 1997

[51] Int. Cl.$^6$ .................................................. C08K 5/34
[52] U.S. Cl. .................... 524/100; 524/102; 524/424; 528/423; 428/480
[58] Field of Search .................... 524/100, 102, 524/424; 528/423; 428/480

[56] References Cited

U.S. PATENT DOCUMENTS

| | | | |
|---|---|---|---|
| 2,865,916 | 12/1958 | Leavitt et al. | 528/423 |
| 4,136,090 | 1/1979 | Hoeschele | 528/289 |
| 4,136,715 | 1/1979 | McCormack et al. | 138/130 |
| 4,185,003 | 1/1980 | Hoeschele | 528/301 |
| 4,405,749 | 9/1983 | Nelson | 524/100 |
| 4,524,165 | 6/1985 | Musser et al. | 524/99 |
| 4,771,091 | 9/1988 | Ertl | 524/97 |
| 4,842,257 | 6/1989 | Abu-Isa et al. | 267/133 |
| 5,013,089 | 5/1991 | Abu-Isa et al. | 297/452 |
| 5,169,925 | 12/1992 | Schmailzl et al. | 528/367 |
| 5,533,789 | 7/1996 | McLarty et al. | 297/452.64 |
| 5,594,142 | 1/1997 | Gaa et al. | 546/19 |
| 5,596,888 | 1/1997 | McLarty et al. | 66/195 |

OTHER PUBLICATIONS

U.S. Patent Application Serial No. 08/659,295 Dupont Technical Bulletin—Weathering Protection for Hytrel Polyester Elastomer.

*Primary Examiner*—Kriellion Sanders
*Attorney, Agent, or Firm*—Burns, Doane, Swecker & Mathis, L.L.P.

[57] ABSTRACT

Elastomeric monofilament exhibiting improved long term retention of strength and elongation after exposure to test conditions described by SAE J-1885 are disclosed. The monofilaments comprise in specified amounts as weight percents on weight of monofilament:

(1) at least one elastomeric copolyester polymer, and a stabilizing system comprising:
(2) at least 1% carbon black,
(3) at least one antioxidant,
(4) an oligomeric hindered piperidinyl (HALS) compound having a $pK_a$ of less than 7 or a $pK_a$ from 7 to 12 in combination with an acid scavenger, and
(5) a UV stabilizer other than a hindered piperidinyl (HALS) compound.

The preferred embodiment is a heterofilament wherein the sheath copolyester has a lower melting point than the core and contains (4) according to:

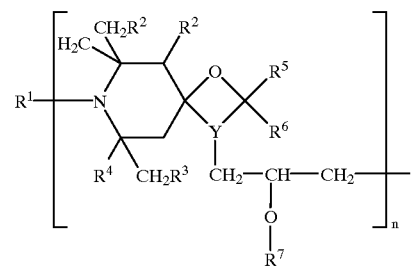

as specified.

9 Claims, No Drawings

MONOFILAMENT

TECHNICAL FIELD

This invention relates to weatherable elastomeric polyester monofilament suitable for outdoor fabrics and suspension fabric constructions for seating, i.e. auto seats, beds, sofas, chairs and the like.

BACKGROUND ART

Increasing need for light weight furniture has lead to the development of "A-surface" fabrics, i.e. fabrics which form both a covering and elastomeric supporting web, eliminating the use of bulky cushioning materials such as polyurethane foam. Demand for improvements in strength retention of A-surface fabrics lay the groundwork for the present invention.

A-surface fabrics used in furniture which incorporate elastomeric monofilaments derive essentially their sole strength. and stretch recovery properties from the structural elastomeric monofilaments having deniers in the 300 to 3000 range. See: U.S. Pat. Nos. 4,545,257, 4,842,257, 5,013,089, 5,533,789, and 5,596,888 for example.

There have been provided heretofore stabilizer systems to improve aging properties of elastomeric copolyesters. U.S. Pat. Nos. 3,651,014; 3,763,109; and 3,766,146, granted Mar. 21, 1972, Oct. 2 and Oct. 16, 1973, respectively, all to Witsiepe disclose certain copolyetherester elastomers which can be used alone or in combination with each other as one of the materials of construction in woven furniture support material.

British Pat. No. 1,458,341, published Dec. 15, 1976 to Browm et al, discloses an orientation and heat-setting process for treating copolyetherester elastomers, which process is conveniently and beneficially used to treat the elastomers disclosed by Witsiepe in the above mentioned U.S. Pat. No. 3,766,146. The heat-setting process of Brown can be used to treat filaments of Witsiepe's copolyetherester elastomers which can be subsequently used in the woven furniture support material.

Heterofilaments are included within the monofilaments herein, such as sheath-core monofilaments. U.S. Pat. No. 4,136,715, granted Jan. 30, 1979 to McCormack et al, discloses composite monofilaments of different copolyetherester elastomers having melting points differing from each other by at least 20° C. Such composite monofilaments can be used in the woven furniture support material of the present invention and are conveniently formed as a "sheath/core" monofilament having a core with higher M.P. than the sheath. However, further improvement in the retention of monofilament physical properties are needed when the end-use includes long term exposure to environmental elements.

Various stabilization means for copolyetherester polymers are known. In U.S. Pat. No. 4,136,090, for example, thermoplastic copolyetherester elastomers are stabilized against heat and light aging by incorporating into the copolyetherester polymer an effective concentration of a phenolic anti-oxidant and a copolyester containing a hindered amine moiety having the structure:

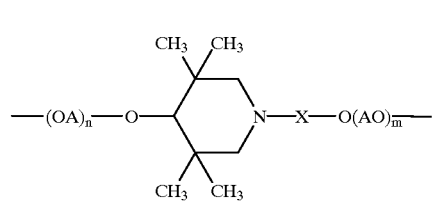

wherein A is ethylene and or propylene, X is a divalent hydrocarbon radical of 2 to 18 carbons and (n+m) equals 5 to 40 and wherein (I) is connected to ester units in the copolyetherester. Although the molecular weight of the bound hindered amine moiety renders it non-migratory, it would be advantageous to provide a higher molar concentration of hindered amine moiety in a lower weight percentage addition of a copolyester so as to retain higher physical properties for a monofilament containing a hindered amine stabilizer material.

Japanese Patent Publication No. 75/91652 discloses the use of a number of hindered piperidine type photostabilizers in combination with phenolic antioxidants in copolyetheresters. However, it has been previously noted, according to U.S. Pat. No. 4,185,003, that when the teaching of this Japanese Publication is followed, photostabilization is improved however heat-aging behavior is worsened (see, column 1, lines 30–45 of U.S. Pat. No. 4,185,003). The improvement taught in U.S. Pat. No. 4,185,003 is the combination with the copolyester with phenolic antioxidant and hindered amine having the structure:

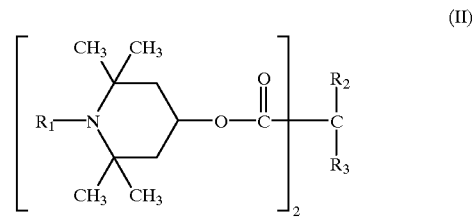

where R is hydrogen or an alkyl radical of 1–12, preferably 1–4 carbon atoms and $R_2$ and $R_3$ represent an alkyl radical hydrocarbons. The use of a hindered amine such as (II) is likely to exhibit a widely varying degree of performance in a monofilament which undergoes a heat-setting treatment at 300° C. which has the tendency to distort the monofilament.

In U.S. Pat. No. 4,340,718, polyester materials, particularly copolyesters, are rendered less susceptible to weathering by incorporating into the polyester resin a dimethyl and diethyl ester of p-methoxybenzylidenemalonic acid having monofunctional terminal ester forming groups or a difunctional comonomer.

U.S. Pat. Nos. 4,355,155 and 4,405,749 each disclose segmented thermoplastic copolyester elastomers which may be stabilized against heat. For example, in U.S. Pat. No. 4,355,155 such stabilizers may include phenols and their derivatives, amines and their derivatives, compounds containing both hydroxyl and amine groups, hydroxyazines, oximes, polymeric phenolic esters and salts of multivalent metals in which the metal is in its lower state (see column 3, lines 46–52), while in U.S. Pat. No. 4,405,749, a particular triazine-based anti-oxidant (i.e., 3,5-di-tert-butyl-4-hydroxyhydrocinnamic acid triester with 1,3,5-tris-(2-hydroxyethyl)-s-triazine-2,4,6-(1H, 3H, 5H) trione) is disclosed as having superior thermal stability.

Each of the compositions of the above prior issued U.S. patents moreover mention that additional stabilization against ultraviolet light may be obtained by compounding the copolyetheresters with various UV absorbers, such as substituted benzophenones or benzotriazoles (see, column 4, lines 1–3 of U.S. Pat. No. 4,355,155; and column 4, lines 10–13 of U.S. Pat. No. 4,405,749).

U.S. Pat. No. 4,524,165 discloses a combination of certain copolyesterether with at least one hindered phenolic antioxidant, at least one ultraviolet light stabilizer compound which is compatible with the specific copolyesterether, and at least one hindered amine having the formulas:

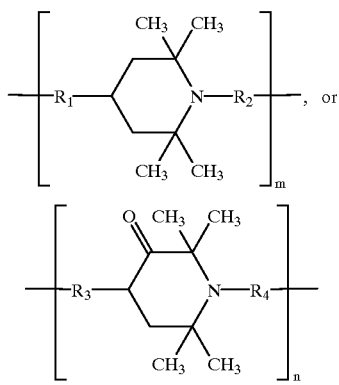

wherein m and n are integers from 1 to 20, $R_{1-4}$ are each independently selected from hydrogen, substituted or unsubstituted alkyl, aryl, alkylene, cycloalkylene, hydroxyalkylene, and esters of hydroxyalkylene, and alkylenecarboxylic acid and esters, amides and metal salts of said alkylenecarboxylic acid. The ultraviolet light stabilizers suggested include monomeric benzotriazoles and monomeric benzophenones. The particular copolyetheresters having superior weathering ability are derived from 1,4-cyclohexanedicarboxylic acid and 1,4-cyclohexanedimethanol, a polyalkylene ether glycol, as compared to terephthalate-based polyesters. In weathering exposure comparisons of stabilized inventive copolyesterethers; versus the terephthalic acid types containing the same stabilizer combinations, the terephthalate types performed significantly worse (rapid aging) than the polyesterethers derived from 1,4-cyclohexane dicarboxylic acid and 1,4-cyclohexane dimethanol. It would be desirable to provide terephthalate-based polyester which exhibit improved aged retention of physical properties, as these types of polyesters are more abundant and economical.

Blends of polybutylene terephthalate and a segmented thermoplastic copolyester elastomer are stabilized against heat, or ultraviolet light in known manner via the addition of various stabilizers. For example, in U.S. Pat. No. 3,907,926, antioxidants and amide stabilizers may be incorporated into the PBT/polyester elastomer blends (see column 6, line 55 bridging column 7, line 25), while U.S. Pat. No. 4,469,851 suggests the phenol derivatives (including 3,5-di-tert-butyl-4-hydroxyhydrocinnamic acid triester with 1,3,5-tris-(2-hydroxyethyl)-s-triazine-2,4,6-(1H, 3H, 5H) trione) may be incorporated into the PBT/polyester elastomer blends for UV-light stabilization functions.

Two considerations are needed to understand sources of failure in phthalate-based copolyesters as monofilament/multifilament composite fabric structural arrays for seating components which are exposed to heat and light. Firstly, the heat stabilizing ability during processing of the fiber and UV resistance under long term UV exposure, and secondly the resistance to heat setting treatments above the HDT of the monofilament used to provide bonding of multifilament yarns to the structural warp and/or weft monofilament fibers. In aging studies there have been evidenced serious consequences from weather aging in terms of retention of strength and elongation properties for heat-set elastomeric phthalate-based monofilament. Furthermore the temperatures required to achieve adequate heat set bonding with multifilament yarns can cause reversion of the polymer as well as redistribution and/or deactivation of the stabilizer system resulting in deleterious effects. The redistribution and/or deactivation has significant effects on long term retention of tensile strength and elongation after the equivalent of long-term exposures to UV irradiation. Specifically, conventionally stabilized terephthalate-based monofilaments which have been heat set exhibit up to 50% loss in tensile strength and elongation properties after exposure up to 451 kilojoules per square meter of irradiation under standard test SAE J-1885. It would be of industrial importance to provide elastomeric structural fibers for furniture support materials A-surface fabrics which can retain a higher proportion, i.e., at least about 85% or higher of the unaged tensile and elongation after heat setting and exposure to 481 KJ under SAE J-1885.

It would be of commercial importance to obtain durable phthalate-based copolyester monofilaments which have improved aging retention of physical properties for seating fabrics made therefrom which have been heat-set and will be exposed on a long term basis to UV irradiation. Furthermore it would be of industrial importance to provide a stabilized elastomeric copolyetherester monofilament that will exhibit high strength, and aged strength retention, low creep (shape and size retention), acid and chlorine resistance, and weathering resistance, even after the fabric heat-setting treatment.

SUMMARY OF THE INVENTION

In accordance with the invention elastomeric monofilament exhibiting improved long term retention of strength and elongation after exposure to test conditions described by SAE J-1885 are disclosed. The monofilaments comprise in specified amounts as weight percents on weight of monofilament:

(1) at least one elastomeric copolyester polymer, and a stabilizing system comprising:

(2) at least 1% carbon black, (3) at least 0.5% to 1.5% of one antioxidant, (4) at least 0.5% up to 1% of an oligomeric hindered piperidinyl (HALS) compound having a $pK_a$ of less than 7 or a $pK_a$ from 7 to 12 in combination with an acid scavenger, and (5) at least 0.25% to 1.3% of a UV stabilizer other than a hindered piperidinyl (HALS) compound.

The phthalate-based polyesters used to provide the stabilized monofilaments are linear and cyclic polyalkylene terephthalates, particularly polyethylene terephthalate (PET), polypropylene terephthalate (PPT), polybutylene terephthalate (PBT), ethylene-1,4-cyclohexylene-dimethylene terephthalate (PETG) and random or block copolymers thereof containing one or more of the above components. Of these, copolymers containing soft segments of polybutylene terephthalate (PBT) copolymers and hard segments of polytetramethylene ether glycol terephthalate are especially preferred.

The preferred phthalate-based copolyesters are commercially available from duPont De Nemours, Inc. and Hoechst Celanese Corporation in the U.S. under the Hytrel® and Riteflex® trademarks, respectively, and are prepared by polymerizing (a) one or more aromatic dicarboxylic acids or their equivalents (and esters or ester-forming derivatives such as acid chlorides, anhydrides, etc.), (b) one or more linear long chain glycols, and (c) one or more low molecular weight diols.

The preferred copolyesters are copolymers of polybutylene terephthalate and polytetramethylene glycol, a block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol.

The preferred elastomeric copolyesters is a copolyetherester which consists essentially of the multiplicity or recurring intralinear long-chain and short-chain units connected head-to-tail through ester linkages, said long-chain ester units being represented by the following structure:

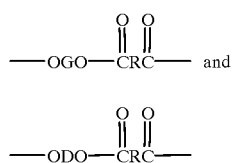

where the long chain ester in (1) is represented by a divalent reacted polyalkylene oxide glycol (G) having a molecular weight between 400 and 6,000 and the short chain ester in (2) is represented by a reacted diol (D) having a molecular weight of less than about 250 and R is a reacted dicarboxylic acid having a molecular weight less than about 300 with the proviso that the short-chain ester units constitute about 10–95% by weight of the copolyetherester and, ergo, the long-chain ester units constitute about 5 to 90% by weight of the copolyetherester.

The term "long-chain ester units" as applied to units in a polymer chain refers to the reaction product of a long-chain glycol with a dicarboxylic acid. Such "long-chain ester units", which are a repeating unit in the copolyetheresters of this invention, correspond to formula (1) above.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (2) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy)diphenyl, bis(p-hydroxyphenyl) methane, and bis(p-hydroxyphenyl) propane. Equivalent esterforming derivatives of diols are also useful (e.g., ethylene oxide or ethylene carbonate can be used in place of ethylene glycol).

Dicarboxylic acids which are reacted with the foregoing long-chain glycols and low molecular weight diols to produce the copolyesters of this invention are aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, as ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substitutent groups or combinations which do not substantially interfere with the copolyester polymer formation and use of the polymer of this invention.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexane-1,2-dicarboxylic acid, 2-ethylsuberic acid, 2,2,3,3-tetrame-thylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis (cyclohexane carboxylic acid), 3,4-furan dicarboxylic acid, and 1,1-cyclobutane dicarboxylic acid.

Among the dicarboxylic acids which are preferred are those with 8–16 carbon atoms are preferred, particularly the phenylene dicarboxylic acids, i.e., phthalic, terephthalic and isophthalic acids and their dimethyl derivatives.

Other representative aromatic dicarboxylic acids which can be used include bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p(β-hydroxyethoxy) benzoic acid can also be used providing an aromatic dicarboxylic acid is also present.

It is preferred that at least about 50% of the short segments are identical and that the identical segments form a homopolymer in the fiber-forming molecular weight range (molecular weight>5000) having a melting point of at least 150° C. and preferably greater than 200° C. Polymers meeting these requirements exhibit a useful level of properties such as tensile strength a nd tear strength. Polymer melting points are conveniently determined by differential scanning calorimetry.

Included among the low molecular weight diols which react to form short chain ester units of the copolyesters are acyclic, alicyclic and aromatic dihydroxy compounds. Preferred are diols with 2–15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1, 5-dihydroxy naphthalene, etc.

The long chain glycols have a molecular weight of about 600–6000, a melting point less than about 55° C. and include the poly(alkylene oxide) glycols such as polyethylene glycol, poly(1,2- and 1,3-propylene oxide) glycol, poly (tetramethylene oxide) glycol, poly(tentamethylene oxide) glycol.

In the most preferred embodiment, an elastomeric monofilament is provided with a concentric, core and sheath configuration. Two different elastomeric copolyesters are employed. In the most preferred elastomeric copolyester in the core, the hard segments consist of polybutylene terephthalate (PBT) and the soft segments consist of poly (tetramethylene ether glycol terephthalate). In terms of Shore hardness the copolymer most preferably for the core has a Shore D hardness of from 55 to 80 and the most preferred polymer for the sheath has a Shore D hardness of from 35 to 55.

In terms of mole percentage of hard and soft segments for the preferred copolyester polymer, the core contains 85 to 98 mole percent of hard segment comprising PBT and 2 to 15% of soft segment comprising polytetramethylene ether glycol. A copolymer containing 70 mole % to 85 mole % hard segment derived from PBT and 15 mole % to 30 mole % soft segment of polytetramethylene ether glycol is the most preferred copolyester contained in sheath. Commercially available polyesters of this type are sold by Hoechst Celanese Corporation, Charlotte, N.C. under the RITEFLEX trademark. A preferred exemplary core contains RITEFLEX 672 (PBT-1) having a Shore D hardness of 72 and the preferred sheath contains RITEFLEX 640 (PBT-2) having a Shore D hardness of 40.

The antioxidants used herein are hindered phenolic types which are commercially available under the IRGANOX trademark from Ciba Geigy. Secondary thermal stabilizers used herein are essential and provide secondary radical and/or oxygen scavenging which is needed during the melt processing steps. These are selected from phosporous containing compounds, e.g., phosphite esters, phosphonites, and thioesters, such as DSTDP-di-stearylthiodipropionate. The preferred secondary stabilizer is SANDOSTAB P-EPQ, from CLARIANT CORP., USA. Amounts are specified at 0.4 to 1% of the monofilament weight.

The monofilament of this invention contains in the stabilizer system an oligomeric hindered amine stabilizer having a $pK_a$ of less than 7 or an oligomeric hindered amine stabilizer having a $pK_a$ of 7 or above combined in the monofilament with an acid scavenger. The oligomeric hindered amine stabilizers used in this invention exhibit a characteristic acidity ($pK_a$). Due to the poor water solubility of hindered amines, pK-values are determined in a solvent/water mixture with potentiometric titration a measurement technique known in the art. An exemplary method of determining $pK_a$ includes dissolving the oligomeric hindered amine in a strong solvent such as isopropanol or tetrafluoroisopropanol and adding 0.1N HCl and subsequently titrating with 0.1N NaOH. Diluted HCl is added in order the generate a hydrochloride and consequently this increases the water solubility of the oligomer. The values of $pK_a$ are of hydrochlorides in isopropanol/water (1:1). The calculation is based on the model of a weak monobasic acid:

$$pK_a = pH \times \log[A]/[HA]$$

where [A] is the concentration of the deprotonated form (dissociated form), [HA] is the concentration of the protonated form (not dissociated form). Measurements of $pK_a$ can be made on a conventional potentiometric device such as is available from Beckman Instruments, USA.

Examples of an oligomeric hindered amine which has a $pK_a$ of less than 7 or are combined with an acid scavenger include: oligomerized 2,2,4,4-tetramethyl-20-(oxiranylmethyl)-7-oxa-3,20-diazadispiro[5.1.11.2] heneicosan-21-one, oligomerized 1,2,2,4,4-pentamethyl-20-(oxiranylmethyl)-7-oxa-3,20-diazadispiro-[5.1.11.2] heneicosan-21-one, oligomerized 1-acetyl-2,2,4,4-tetramethyl-20-(oxiranylmethyl)-7-oxa-3,20-diazadispiro [5.1.11.2]heneicosan-21-one, poly-N,N'-bis-(2,2,6,6-tetramethyl-4-piperidyl),-1,8-diazadecylene, addition compound of 2,2,6,6-tetramethyl-4-allyloxypiperidine with polymethylhydrodosiloxane (molecular mass up to 4000), addition compound of 1,2,2,6,6-pentamethyl-4-allyloxypiperidine and polymethylhydridosiloxane (molecular mass up to 4000), a copolymer of styrene with β-methylstyrene and maleic anhydride reacted with 4-amino-1,2,2,6,6-pentamethylpiperidine and octadecylamine, polycarbonate with 2,2'-bis[(2,2,6,6-tetramethyl-4-piperidyl)imino] ethanol as diol component, polycarbonate of 2,2'-bis[(1,2,2,6,6-pentamethy-4-piperidyl)imino ethanol as diol component, copolymer of maleic anhydride and a β-olefin up to 30 carbons reacted with 4-amino-2,2,6,6-tetramethylpiperidine, copolymer of maleic anhydride and a β-olefin up to 30 carbons reacted with 1-acetyl-4-amino-2,2,6,6-tetramethyl-piperidine, copolymer of maleic anhydride and a β-olefin up to 30 carbons reacted with 4-amino-1,2,2,6,6-pentamethylpiperidine, and polyalkyl-1-oxa-diazaspirodecanes

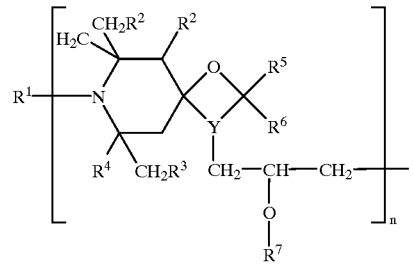

wherein n is an integer from 2 to 50, Y is a group of the formula

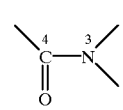

II

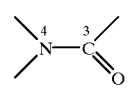

III the indices 3 and 4 giving the ring positions in the diazaspirodecane system and one bond of the nitrogen being linked with a $CH_2$ group of the propylene-2-oxy group, $R^1$ is a hydrogen atom, an oxygen atom, an NO group, an alkyl group, a $C_1$ to $C_{22}$ acyl group, or a benzyl group, $R^2$ and $R^3$ are either identical or different hydrogen atoms or $C_1$–$C_5$ alkyl groups with $R^4$ being a methyl group, or $R^2$ is a hydrogen atom or a $C_1$–$C_5$-alkyl group and $R^3$ and $R^4$ together with the carbon atoms linking them form a $C_5$- or $C_8$-cycloalkyl group or a group of the formula:

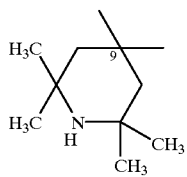

$R^5$ and $R^6$ are identical or different and represent a hydrogen atom, a $C_1-C_{30}$-alkyl group, an unsubstituted or chlorine- or $C_1-C_4$-alkyl-substituted phenyl or naphthyl group or an unsubstituted or $C_{1-C_4}$-alkyl-substituted $C_5-C_{18}$-cycloalkyl group or a group of the formula

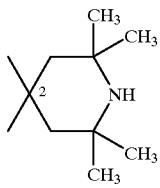

and $R^7$ is a hydrogen atom or a $C_1-C_{22}$-acyl group and as a terminal unit, the oxygen atom of the acyl group is linked with the terminal $CH_2$ group to form an oxirane ring. The above oligomeric hindered amines which have a $pK_a$ of less than 7 are usable without an acid scavenger. The preferred oligomeric hindered amine has the formula:

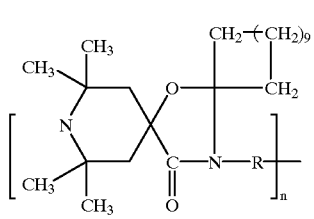

(3)

wherein n is in a range of from 2 to 50 and R is a functional group reactive to amide nitrogen, e.g. epichlorohydrin as disclosed in U.S. Pat. No. 5,169,925 which is incorporated herein by reference.

Another Suitable hindered amine usable without an acid scavenger and which has a $pK_a$ of less than 7 has the formula:

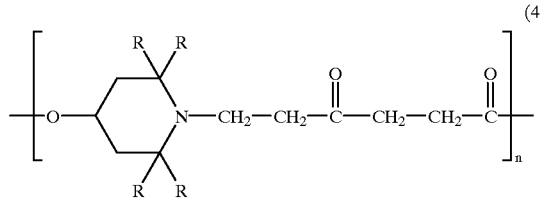

(4)

wherein R is alkyl, like methyl and n is 2 to 200. Suitable embodiments of (4) are disclosed in U.S. Pat. No. 4,233,412, which is incorporated herein by reference, and commercially available from Ciba Geigy, as Tinuvin® 622. Tinuvin® 123, is an oligomeric hindered amine having a $pK_a$ of less than 7, and is also suitably usable without an acid scavenger. Uvisil® 299, an oligomeric hindered amine, available from Great Lakes Chemical, Inc., is another suitable hindered amine usable without an acid scavenger and exhibits a $pK_a$ of less than 7. The most preferred hindered amine is available from Hoechst Celanese/Clariant Corp. USA as Hostavin N-30.

Other suitable oligomeric hindered amines are disclosed in EP 0 690 094 as "amine M", "amine P", "amine Q", and "amine R". The molecular weight or weight average molecular weight of the oligomeric hindered amine is from 300 to 10,000, preferably 1000 to 7500. The amount of oligomeric hindered amine needed is from 0.5 to 2%, preferably 0.5 to 0.8%.

If the oligomeric hindered amine has a $pK_a$ of 7 or higher, an acid scavenger is required. Suitable acid scavengers include alkaline earth metal salts of fatty acids, like calcium stearate, and fine particle size metal oxides or hydroxides suitable for use in fibers, such as oxides of zinc, aluminum, calcium or magnesium, or hydroxides of any of these metals. Specific example oxides and hydroxides include zinc oxide, zinc hydroxide, aluminum hydroxide, and magnesium oxide. The amount of acid scavenger is in a range of from 0.1 wt. percent to about 3 wt. percent. If more than 3 wt. percent is used, the physical properties of the monofilament are compromised.

Suitable carbon black is commercially available from Cabot Chemical, Inc. under the designation 880 Black Pearls®. The amount of carbon black contained in a masterbatch which is incorporated into the monofilament is 20 or more wt. %, preferably about 25 wt. %. The final concentration of carbon black in the monofilament is from 0.75% to 2%. The minimum amount is critical, in that below this amount the retention of physical properties after aging exposure us unacceptable.

The instant monofilament also contains from at least one UV stabilizer other than an ologomerized hindered amine such as: 2-(2'Hydroxphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-bydroxyphenyl)benzotriazole, 2-[2'-hydroxy-5'-(1,1,3,3-tetramethylbutyl)phenyl]benzotriazole, 2-(3'-5'-di-tert-butyl-2'-hydroxyhenyl)-5-chlorobenzotriazole, 2-(3'tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octoxy-phenyl) benzotriazole, 2-(3',5'-di-tert-amyl-2'-hydroxy-phenyl) benzotriazole, 2-(3',5'-bis($\beta$,$\beta$-dimethylbenzyl)-2'hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethyl-hexyloxy)carbonylethyl]-2'-hydroxyphenyl)-5-chlorobenzo-triazole, 2-(3'-tert-butyl-2'-hydroxy-5'-(2-methyxycarbonylethyl)phenyl)-5-chlorobenzotriazole, 2-(3'-tert-butyl-2'-hydroxy-5'-(2-methoxycarbonylethyl) phenyl)benzo-triazole, 2-(3'-tert-butyl-2'-hydroxy-(2-octyloxy-carbonylethyl)phenyl)benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctylocycarbonylethyl) phenylbenzotriazole, 2,2'-methylenebis[4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl]benzo-triazole with polyethylene glycol 300; [R—$CH_2CH_2$—COO($CH_2$)$_3$]$_2$ where R=3'-tert-butyl-4'-hydroxy-5'-2H-benzotriazol-2-ylphenyl; [R—$CH_2CH_2$—COO($CH_2CH_2O$)$_{N/2}$]$_2$ where n=1 to 5 and R-3'-tert-butyl-4'-hydroxy-5'-2H-benzotriazol-2-ylphenyl.

The most preferred UV stabilizer is a polymeric benzotriazole functional polymer having the general formula (PHS-BZT):

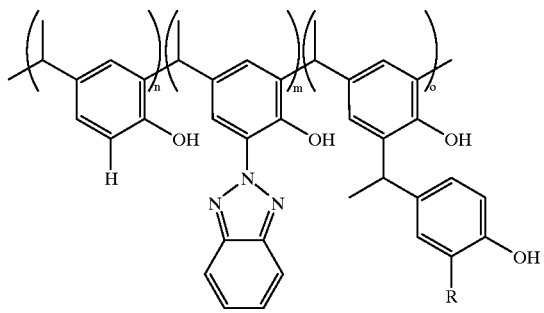

Wherein:

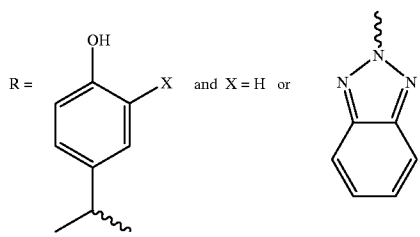

PHS-BZT embodiments are disclosed in U.S. App. Ser. No. 08/659,295 which is incorporated herein by reference. Other suitable UV stabilizers include the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di(4-methoxypropyl-amino-2,2,6,6-tetramethylpiperidyl)-1,3,5-triazine and 1,2-bis(3-aminopropylamino)ethane, the condensation product of 2-chloro-4,6-di-(4-methoxy-propylamino-1,2,2,6,6-pentamethylpiperidyl)-1,3,5-triazine and 1,2-bis(3-aminopropylamino)ethane, the condensation product of 2-chloro-4,6-di(4-n-butylamino-1,2,2,6,6-pentamethyl-piperidyl)-1,3,5-triazine and 1,2-bis(3-aminopropyl-amino) ethane, the reaction product of 2-chloro-4,6-di-(4-n-butylamino-2,2,6,6-tetramethylpiperidyl)-1,3,5-triazine with monovalent or polyvalent amines, between one and all of the active hydrogen atoms on the amine being replaced, such as with ethylenediamine, diethylenetriamine, triethylentetramine, hexamethylenediamine, and 1,2-bis(3-aminopropylamino)ethane, reaction products of 2-chloro-4,6-di(4-n-butylamino-1,2,2,6,6-pentamethylpiperidyl)-1,3,5-triazine with monovalent or polyvalent amines, between one and all of the active hydrogen atoms on the amine being replaced, such as with ethylenediamine, diethylaminetriamine, triethylenetetramine, hexamethylenediamine and 1,2-bis(3-aminopropylamino)-ethane, reaction products of 2-chloro-4,6-di(4-n-butyl-amio-2,2,6,6-tetramethylpiperidyl)-1,3,5-triazine and 4-tert-octylamino-2,6-dichloro-1,3,5-s-triazine with monovalent or polyvalent amines, between one and all of the active hydrogen atoms on the amine being replaced, such as with ethylenediamine, diethylenetriamine, tri-ethylenetetramine, hexamethylenediamine and 1,2,-bis-(3-aminopropylamino)ethane, reaction products of 2-chloro-4,6-di-(4-n-butylamino-1,2,2,6,6-pentamethylpiperidyl)-1,3,5-triazine and 4-tert-octylamino-2,6-di-chloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis(3-aminopropylamino)ethane, reaction products of 2-chloro-4,6-di-(4-n-butylamino-2,2,6,6-tetramethylpiperidyl)-1,3,5-triazine and 4-(4-n-butylamino-2,2,6,6-tetramethylpiperidyl)-2,6-di-chloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis-(3-aminopropylamino)ethane, reaction products of 2-chloro-4,6-di-(4-n-butylamino-1,2,2,6,6-pentamethylpiperidyl)-1, 3,5-triazine and 4-(4-n-butylamino-2,2,6,6-tetramethylpiperidyl)-2,6-di-chloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis-(3-aminopropylamino)ethane, 3-dodecyl-7,7,9,9-tetramethyl-1,3,8-triazaspiro[4,5]-decane-2,4-dione, Still other suitable UV stabilizers include 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecycloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-dimethylphenyl)-1,3,5-triazine and 2-hydroxy-4-(2-hydroxy-3-octyloxypropyloxy)-phenyl]-4,6-bis(2,4-dimethylphenyl)-1,3,5-triazine.

The most preferred light stabilizer is a polymeric benzotriazole-functional polymer.

Poly(hydroxystyrene benzotriazole)(PHS-BZT) can be synthesized from the homopolymerization of hydroxyphenylmethyl carbinol (HMPC-BZT)(e.g., 4-HMPC-BZT) or co-polymerization of HMPC-BZT with ortho, meta, or para hydroxyphenylmethyl carbinol(2,3,4-HMPC), either in melt or solution (e.g. in methanol or acetic acid). A mineral acid is used as a catalyst.

The intermediate hydroxyphenylmethyl carbinol benzotriazole (HMPC-BZT) can be made by azo-coupling of 4-hydroxyacetophenone with the diazonium chloride salt of orthonitroaniline followed by reductive cyclization with a reducing agent such as thiourea dioxide to yield 4-hydroxyacetophenone(4-HAP-BZT). The 4-HAP-BZT is further reduced with any suitable reducing agent (e.g. $NaBH_4$ in NaOH) to yield the secondary alcohol 4-hydroxyphenylmethyl carbinol benzotriazole (4-HPMC-BZT).

An exemplary Graft copolymer embodiment of PHS-BZT is prepared from a polyhydroxystyrene-Novolak grade (PHS-N) which is first made in a vessel by combining 4-hydroxyphenylmethylcarbinol (1 g) and 25 mL glacial acetic acid, then adding 3 drops concentrated sulfuric acid. After two days, the solution is added dropwise to water to form a precipitate slurry of PHS-N polymer. The slurry is stirred for 1 hour, polymer is filtered, and washed with water and dried.

PHS-N (0.48 g, Mw-5600) and HPMC-BZT (91.9%, 0.14 g) are dissolved in 25 mL glacial acetic acid. Following the addition of 3 drops of concentrated sulfuric acid, the solution is stirred at room temperature for 3 days. The solution is added dropwise to 300 ml water to precipitate the polymer. The polymer is then filtered and dried overnight in a warm (<59° C.) oven with a nitrogen purge, yielding an off-white powder. Reaction is believed to occur at the carbinol hydroxy group, while the phenol group does not react. This result is confirmed from UV-VIS absorption spectra where $\lambda_{max}$ observed at 354 nm will blue shift if hydrogen bonding between the ortho hydroxy and benzotriazole group is disrupted. No shift in $\lambda_{max}$ is observed when comparing HPMC-BZT to PHS-BZT. Mw obtained by GPC is typically about 6077 with a polydispersity of about 1.6.

A co-polymer embodiment of PHS-BZT (co-HMPC-BZT) is made as follows:

to a vessel is added 2-Hydroxyphenylmethyl carbinol (90%, 5.35 g), 4-hydroxyphenylmethylcarbinol benzotriazole (91.9%, 1.03 g) and 25 mL glacial acetic acid, then 3 drops concentrated sulfuric acid is added. After two days, the solution is added dropwise to water to precipitate the polymer. After the slurry is stirred one hour, the polymer is filtered, washed with water then toluene, and dried. Based on UV-Vis absorption spectra, the HMPC-BZT is incorporated into the polymer through reaction at the carbinol.

A further example PHS-BZT Co-polymer (HPMC-BZT+ 4-HPMC) is made as follows: in a vessel are combined 5.41 g HPMC-BZT (99.8%) and 20.21 g 4-HPMC (97.7%) with 350 mL glacial acetic acid. The slurry is stirred until most of the starting material is dissolved. Concentrated sulfuric acid (2 drops) is added and the solution is then stirred at room temperature two days. The solution is added dropwise to 120 mL water while stirring. The polymer is filtered after stirring 1 hour, washed with 3 portions (200 mL) water, followed by 2 portions (250 mL) toluene. After drying in a vacuum oven overnight, about 26.30 g off-white powder is collected. UV-Vis absorption spectral results are identical to those observed with the graft and 2-HPMC co-polymer. No blue shift in $\lambda_{max}$ is observed. GPC analysis gives a molecular weight (Mw) of 3619 with a polydispersity of 1.52. The structure was confirmed by NMR.

A-Surface Stretch Fabric

The monofilament of the present invention is advantageously incorporated in support fabric for seating and bedding, such as automobile seats, buses, trains, aircraft, and bedding (hereinafter collectively referred to as 'suspension fabric') by conventional fabricating means known in the art.

The preferred furniture support material is a warp knit fabric made by knitting oriented monofilaments in one or more than one denier size, alone or with one or more than one type of multifilament yarn (yarn)1. Where monofilaments are woven or knitted together with multifilament yarns(s), monofilaments preferably lie in one direction and the yarn in the direction perpendicular to the monofilament, and then heat setting or otherwise causing a sufficient number of multifil yarn fiber surfaces to adhere to the monofilaments. Preferably a black homofil wrapped with dyed multifilament yarns, the homofil having a denier in the range of from 250–500 will lie in the fill (weft) direction and a unwrapped heterofilament comprising (1) to (5) specified above and having a denier in the range of from 900–3000 will lie in the warp direction. Standard weaving and knitting techniques can be used to prepare the furniture support fabrics utilizing the monofilaments of the present invention. Specifically, the seating structure will preferably include a seating frame, a seating support web, a back frame and a back support web. In the preferred embodiment, the seating support web and the back support web are disposed in tension over the seating frame and back frame respectively without the need for added cushions or other support structures, although it is contemplated that such support structures could be utilized if desired.

Multifill-wrapped elastomeric monofilament yarn is obtainable from World Elastic whose business address is believed to be 231 Pounds Avenue SW, Concord, N.C. 28025 by supplying a suitable monofilament of this invention.

The invention also provides a seating structure, comprising: a seating frame; a seating support web disposed in stretched relation across the seating frame; a back support web disposed in stretched relation across the back frame, wherein at least one of the seating support web or the back support web comprises a warp knit weft-insertion fabric having an elastomeric monofilament yarn in the warp forming a performance side, an elastomeric wrapped filament yarn in the weft forming an aesthetic surface and a knit filament yarn tying the warp and the weft together.

The method of spinning a heterofilament, for example, spinning a 30/70 sheath/core type, the core extruder conditions; using a 72 shore D copolyester are:

| | |
|---|---|
| Zone 1 | 289° C. |
| Zone 2 | 285° C. |
| Zone 3 | 279° C. |
| Flange temp. | 279° C. |
| Melt temp. | 272° C. |
| Spin Head temp. | 291° C. |
| Spin pump gear speed | 17.3 rpm. |

The extruder conditions for spinning a 40 shore D sheath copolyester are:

| | |
|---|---|
| Zone 1 | 265° C. |
| Zone 2 | 270° C. |
| Zone 3 | 270° C. |
| Zone 4 | 269° C. |
| Flange temp. | 225° C. |
| Melt temp. | 254° C. |
| Spin pump speed | 7.4 rpm |

The quench tank is set at 68° C. and contains a small amount of conventional lubricant. The 1st stretch tank is set at 90° C.; the 2nd stretch tank is set at 90° C.; the tunnel dryer temp is 120° C. and the heat set oven temperature is set at 148° C.

| | |
|---|---|
| 1st roll stand | 16.5 m/min. |
| 2nd roll stand | 72.5 m/min. |
| 3rd roll stand | 67 m/min. |
| 4th roll stand | 65 m/min. |
| counter roll | 5 rpm |

Finish can be applied anywhere during the drawing stages. Preferably a non-absorbing finish such as a castor oil based finish is used at a 0.25–0.35 weight gain. Spooling tension is 25–50 g. depending directly on denier of the monofilament. The most preferred 2250 denier heterofilament exhibits the following nominal values:

| | |
|---|---|
| Instron (gauge length) | 254 nm |
| breaking strength | 4 kg ± .5 |
| dtex | 2500 ± 60 g |
| Shrinkage 100° C. 10 min. | 5 ± 1.5% |
| Elongation | 90 ± 15% |
| Tenacity | >2 g/d |

Comparative Examples

A black masterbatch was prepared by combining the following ingredients on a volume % basis into a compounder followed by extrusion and chopping into pellets using a twin screw extruder:

| PBT-1 copolymer | 75% |
|---|---|
| Carbon black** | 25% |

A second masterbatch was prepared using the following wt. % of components:

| Masterbatch C-1 | Wt. % | |
|---|---|---|
| PBT-1 copolymer | 78.0% | |
| IRGANOX 3125 | 5.0% | antioxidant |
| SANDOSTAB P-EPQ | 5.0% | costabilizer |
| HOSTAVIN N-30 | 8.0% | oligomeric hindered amine |
| CYASORB 5411 | 4.0% | benzotriazole UV stabilizer |

EXAMPLE C1

A 5 volume % loading of masterbatch C1 was incorporated as a uniform mixture into PBT-1 and PBT-2 separately. Melt mixing was done in a conventional compounding extruder and pelletized compounds of PBT-1 and PBT-2 were formed. The pelletized compounds were conditioned McCosh dryer for a time and temperature sufficient to remove moisture and fed to a Comet Mixer which volumetrically blended resin and masterbatch(es). The blend was fed to the feed throat of spinning equipment comprising a positive displacement spin pump for each polymer melt stream, and a spin pack designed to converge the polymer melt streams into a concentric sheath-core mono-filaments. Monofilaments were spun under the conditions above in the form of essentially round monofilaments having a 2250 denier.

EXAMPLE C2

A 10 volume % loading of masterbatch C1 was incorporated as a uniform mixture using the same techniques as in the previous example. The pelletized compounds were conditioned and spun as in the previous example in the form of 2250 denier, 70/30 core:sheath monofilament.

EXAMPLE 3

A 10 volume % loading of masterbatch C1 and a 4 volume % loading of the black masterbatch was incorporated as a uniform mixture into PBT-1 and PBT-2 separately following the same techniques above. The pelletized compounds were spun as above into a concentric sheath-core mono-filament in the form of a 2250 denier, 70/30 core:sheath monofilament.

EXAMPLE 4

A masterbatch 2 was prepared using the following wt. percent of components:

| Masterbatch 2 | Wt. % |
|---|---|
| PBT-1 copolymer | 86 |
| IRGANOX 1330 | 5.0 |
| SANDOSTAB P-EPQ | 5.0 |

| Masterbatch 2 | Wt. % |
|---|---|
| HOSTAVIN N-30 | 5.0 |
| PHS-BZT[1] | 8.0 |

[1]PHS- copolymer of HPMC-BZT and 2-HPMC; contains 20–30 wt % benzotriazole; MW 3,000–5,000; m.p. 163° C.

A 10 wt. % loading of masterbach 2 and a 4 vol. wt. % loading of the black masterbatch was incorporated into core PBT-1 and sheath PBT-2 polymers separately on a compounding extruder in the same fashion as in the previous examples. Surprisingly this monofilament exhibited no loss in strength or elongation after thermal aging at 105° C. for 13 days and only a 1.7% loss of tensile strength after 488 kilo Joules of UV radiation.

The following table summarizes the retained strength of the example monofilaments following cumulative exposure using the test method described by SAE J-1885:

| KJOULES | Percent Tensile Strength Retained | | |
|---|---|---|---|
| Exposure | Example 3 | Control C2 | Control C1 |
| 37.6 | 98 | 94 | 94 |
| 112.8 | 92 | 59 | 86 |
| 225.6 | 93 | 46 | 60 |
| 338.4 | 88 | 42 | 48 |
| 488.0 | 88 | 36 | 41 |

We claim:

1. A polyester monofilament comprising hereinafter as weight percents on weight of said monofilament:

(1) at least one copolyester polymer, and a stabilizing system consisting essentially of (2) at least 0.75% carbon black, (3) at least one antioxidant, and a secondary heat stabilizer, (4) an oligomeric hindered piperidinyl (HALS) compound, and (5) a polymeric benzotriazole functional polymer having the formula:

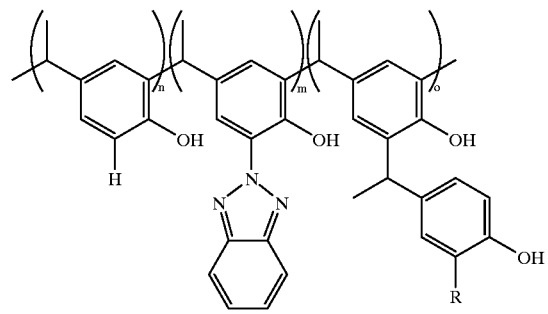

Wherein:

R = 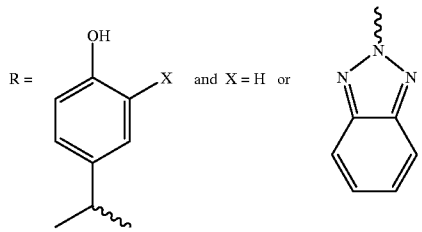 and X = H or 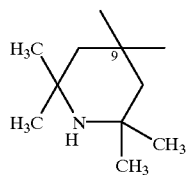

as a UV stabilizer.

2. The monofilament of claim 1 wherein (4) comprises

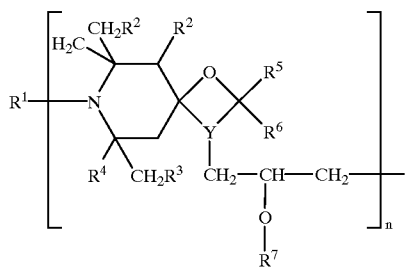

wherein n is an integer from 2 to 50, Y is a group of the formula

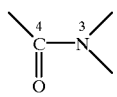   II

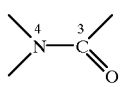   III

II or III, the indices 3 and 4 giving the ring positions in the diazaspirodecane system and one bond of the nitrogen being linked with a $CH_2$ group of the propylene-2-oxy group, $R^1$ is a hydrogen atom, an oxygen atom, an NO group, an alkyl group, a $C_1$ to $C_{22}$ acyl group, or a benzyl group, $R^2$ and $R^3$ are either identical or different hydrogen atoms or $C_1$–$C_5$ alkyl groups with $R^4$ being a methyl group, or $R^2$ is a hydrogen atom or a $C_1$–$C_5$-alkyl group and $R^3$ and $R^4$ together with the carbon atoms linking them form a $C_5$- or $C_8$-cycloalkyl group or a group of the formula:

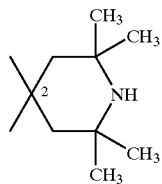

$R^5$ and $R^6$ are identical or different and represent a hydrogen atom, a $C_1$–$C_{30}$-alkyl group, an unsubstituted or chlorine- or $C_1$–$C_4$-alkyl-substituted phenyl or naphthyl group or an unsubstituted or $C_1$–$C_4$-alkyl-substituted $C_5$–$C_{18}$-cycloalkyl group or a group of the formula:

and $R^7$ is a hydrogen atom or a $C_1$–$C_{22}$-acyl group and as a terminal unit, the oxygen atom of the acyl group is linked with the terminal $CH_2$ group to form an oxirane ring.

3. The monofilament of claim 1 further comprising a core and a sheath, said core comprising a copolyester having from 85 to 98 mole % hard segments comprising polybutylene terephthalate (PBT) and 2 to 15 mole % soft segments comprising polytetramethylene ether glycol (PTMG), and said sheath comprising a copolyester having from 70 to 85 mole % PBT and from 15 to 30 mole % soft segments comprising PTMG.

4. The monofilament of claim 1, wherein said oligomeric hindered piperidinyl (4) has a pKa of 7 or below.

5. The monofilament of claim 1, wherein said oligomeric hindered piperidinyl (4) has a pKa from 7 to 12 and wherein said monofilament further comprises an acid scavenger.

6. The monofilament of claim 5, wherein the amount of said acid scavenger in the monofilament is from 0.1% to 3%.

7. The monofilament of claim 1, wherein the amount of said oligomeric hindered piperidinyl (4) is from 0.5% to 2% by weight.

8. The monofilament of claim 1 which retains at least 90 percent of unaged tensile strength after 481 Kjoules of irradiation per SAE J-1885.

9. The monofilament of claim 1 which retains at least 90 percent of unaged tensile strength after 481 Kjoules of irradiation per SAE J-1885.

* * * * *